Aug. 4, 1942.　　　C. H. COOLIDGE　　　2,292,056
SEAM PROTECTING MECHANISM FOR CLOTH SHEARS
Filed July 31, 1941　　　2 Sheets-Sheet 1

INVENTOR
CHARLES H. COOLIDGE
By Attorney
Chas. T. Hawley

Patented Aug. 4, 1942

2,292,056

UNITED STATES PATENT OFFICE 2,292,056

SEAM PROTECTING MECHANISM FOR CLOTH SHEARS

Charles H. Coolidge, Worcester, Mass., assignor to Curtis & Marble Machine Company, Worcester, Mass., a corporation of Massachusetts Application July 31, 1941, Serial No. 404,808

8 Claims. (Cl. 26—17)

This invention relates to machines for shearing cloth, in the process of cloth finishing. In such machines, the thread ends are severed by rotary cutters revolving at high speed and adjacent fixed knife blades. When a seam, rough selvage or foreign substance in the cloth approaches the cutters, it is necessary to interrupt the shearing action until the obstruction has passed beyond the last one of the series of cutters commonly used.

In the machine shown in my prior Patent No. 2,040,295, I accomplished this result by reversing the direction of rotation of the cutters or revolvers and by running the same backwards during the passage of a seam or other obstruction.

It is the general object of my present invention to improve and simplify the mechanism which controls the reversal of the cutter-driving motors.

A further object is to provide simplified mechanism which will restore cutting action at a predetermined interval after an obstruction has entirely passed a detecting member, and which will also start the time interval over if one or more succeeding obstructions approach and are detected before the first time interval has fully elapsed.

Two forms of my invention are shown in the drawings, in which

Figure 3:
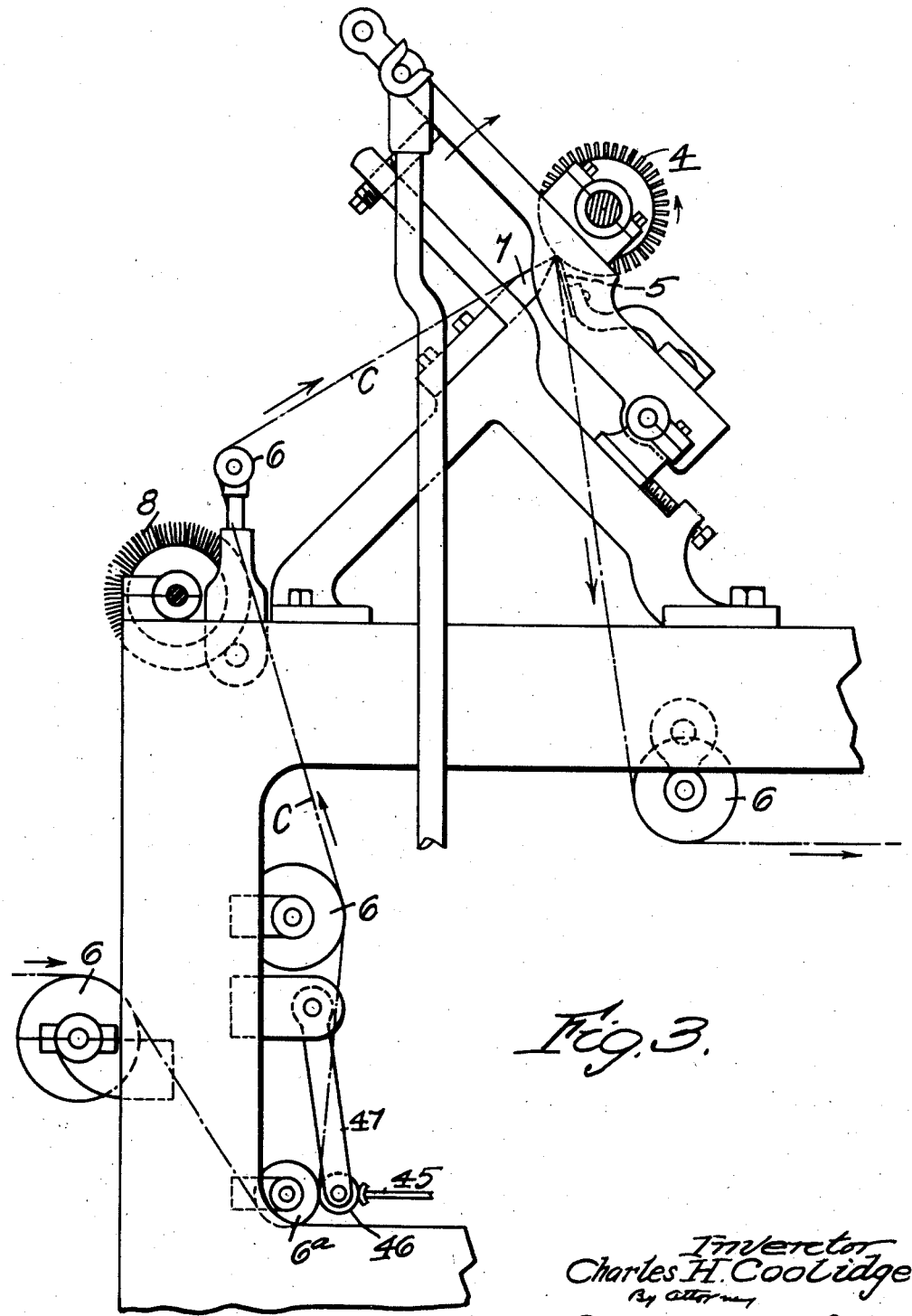
Fig. 3 is a partial rear side elevation of a cloth shearing machine to which my invention may be applied.

In Fig. 3 I have shown parts of a commercial shearing machine such as is disclosed in my prior Patent No. 2,112,905, issued April 5, 1938, and embodying a revolving shearing element or cutter 4, a fixed shearing element or blade 5, a plurality of the usual guide-rolls 6 and a fixed cloth rest 7, said guide-rolls and cloth rest serving to guide the cloth C through the machine. I have also indicated a brush 8 which engages the cloth as it approaches the shearing point. All of these parts are of the usual construction and in themselves form no part of my present invention. A reversible driving motor (not shown) is provided for rotating each cutter 4, and suitable power means is also provided for drawing the cloth through the machine and for rotating the brush 8. It will be understood that any desired number of cutters 4 and fixed cutter blades 5 may be provided in the machine and that each cutter 4 will have its own reversible motor drive.

Figure 1:
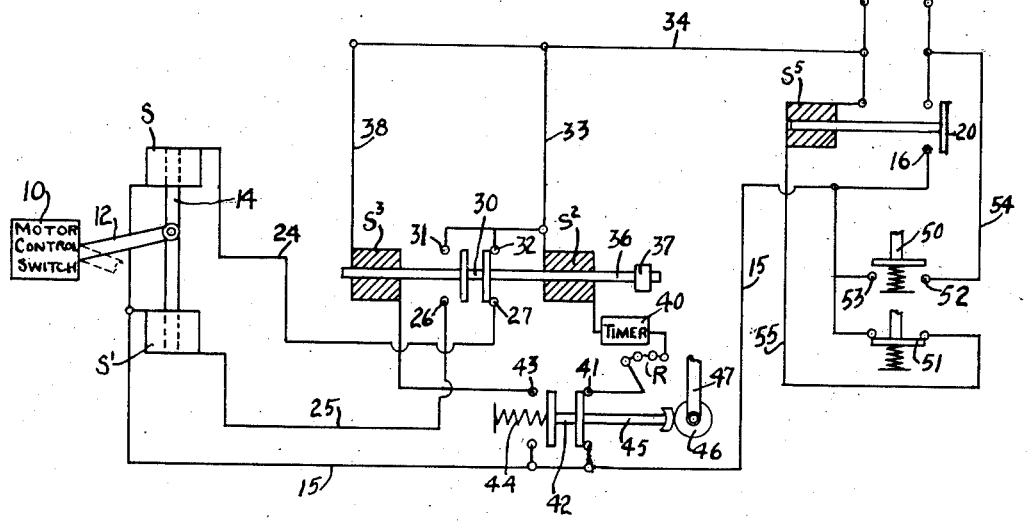
Fig. 1 is a diagrammatic view of an electrical control and timing mechanism.

Referring to Fig. 1, I have shown a usual switch 10 by which the cutter-driving motors in a cloth shear may be started and reversed. In the position shown in the drawings, the switch 10 is set to cause the cutter motors to revolve in a forward direction. With the control lever 12 in the dotted line position, the cutter motors will run backward.

The lever 12 is operatively connected to a plunger 14 alternately controlled by two solenoids S and S'. When the solenoid S is energized, the switch will be moved to the full line position for a cutting operation, and when the solenoid S' is energized, the motors will be reversed and the cutters will run backward.

A common return wire 15 from the solenoids S and S' is connected to the lower contact 16 of a holding switch 20, and through this switch connection may be made to a line wire L through a hand-operated main line switch 22. The other leads of the solenoids S and S' are connected respectively through wires 24 and 25 to contacts 26 and 27 in a double-throw switch 30. The other contacts 31 and 32 of the switch 30 are connected by wires 33 and 34 to a line wire L'.

The double-pole switch 30 is mounted on a plunger 36 slidable in a friction device 37 and controlled by solenoids S² and S³. When the solenoid S² is energized, the switch 30 will occupy the position shown in Fig. 1.

One lead of the solenoid S² is connected through the wires 33 and 34 to the line wire L', and one lead of the solenoid S³ is similarly connected through wires 38 and 34 to the line wire L'.

The second lead of the solenoid S² is connected through a delay device or timer 40 and a variable resistance R to one terminal 41 of a double-pole switch 42, and the second lead of the solenoid S³ is similarly connected to a terminal 43 in the switch 42. The third and fourth terminals of the switch 42 are connected to the return wire 15 previously described and thence through the holding switch 20 to the line wire L.

The switch 42 is normally held in the position indicated by a compression spring 44, and is provided with a rod 45 adapted to be engaged by a detector roll 46 mounted on arms 47 and coacting with one of the guide-rolls 6ª (Fig. 3). The cloth C is drawn between the guide-roll 6ª and the detector roll 46 and the detector roll is swung to the right in Fig. 3 or to the left in Figs. 1 or 2 on engagement by an obstruction approaching the cutters.

The construction and operation of the detecting device is disclosed in detail in each of my prior Patents No. 2,020,877, No. 2,040,295 and No. 2,112,905, to which reference is made. For present purposes, it is sufficient to say that engagement of the detector roll 46 by an obstruction in the cloth moves the detector switch 42 to the left, thus breaking the circuit through the solenoid $S^2$ and completing the circuit through the solenoid $S^3$.

This causes the double-pole switch 30 to shift to the left and connects terminal 31 to terminal 26, thus de-energizing solenoid S and energizing the solenoid S' and shifting the switch 10 to reverse the cutter motors. The cutters will revolve backwards so long as the switch 42 remains in its left-hand position.

When the obstruction has entirely passed and the detector roll 46 has moved to the right to its normal position, the double-pole switch 42 will be shifted by the spring 44, thus completing a circuit through the terminal 41, the delay device or timer 40 and the solenoid $S^2$.

The device 40 may be a commercial electronic timer or any other usual electrical device which will retard the building up of effective current through the solenoid $S^2$ for a definite time interval by use of condensers, resistances or other well known devices. Such timing devices are commercially available and in themselves form no part of my present invention. The time interval may be varied by adjusting the resistance R, which may be a component of the timing device.

When the circuit is closed through the timer 40 and the solenoid $S^2$, the solenoid will thus be energized after a predetermined time interval and will then return the switch 30 to the position shown in Fig. 1. This breaks the circuit for the reversing solenoid S' and energizes the solenoid S, which will then shift the lever 12 and switch 10 to normal position and to rotate the cutters in forward direction.

It will be noted that the time interval starts only as the detector roll 46 and switch 42 are returned to their normal positions shown in Fig. 1. Consequently, the device will operate satisfactorily when a long rough selvage or other obstruction is encountered in the cloth, as the time interval starts from the return of the detector switch rather than from the initial actuation of the switch. Similarly, if one or more additional obstructions come along before the time interval is fully completed, the circuit through the contact 41 and timer 40 will be broken and the timing will be voided. When the circuit is again completed, a full time interval will be required to render the solenoid $S^2$ operative.

For convenience in operation, I have shown a starting switch or button 50 and a stop switch or button 51. The switch 50 is normally open and the switch 51 is normally closed. The switch 51 is connected through a solenoid $S^5$ to the line wire L', and this solenoid, when energized, closes the normally-open holding switch 20.

To start the machine in operation, the main line switch 22 is first closed, after which the starting button 50 is momentarily depressed to close the circuit between the terminals 52 and 53. A circuit is thus completed from the line wire L through the wire 54, the starting switch 50, the closed stop button or switch 51 and the wire 55 to the solenoid $S^5$ and thence to the line wire L'. This energizes the solenoid $S^5$, which promptly closes the switch 20, thus completing a circuit from the line wire L to the wire 15 previously described.

If the stop button 51 is thereafter depressed, the circuit through the solenoid $S^5$ will be broken, the holding switch 20 will be released, and the supply of power to operate the shear will be interrupted.

Figure 2:
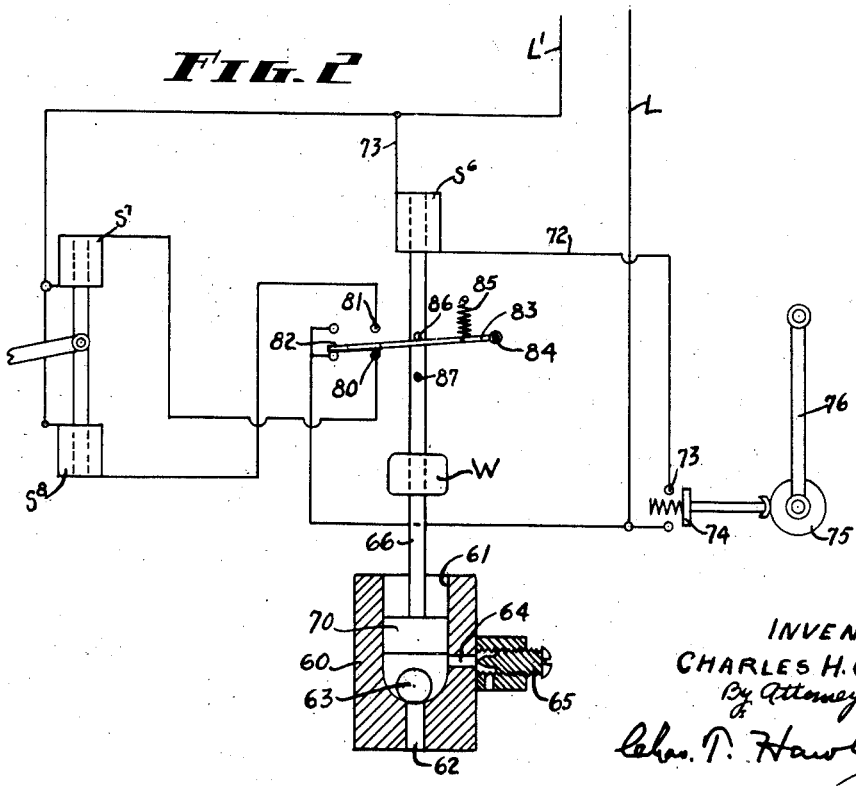
Fig. 2 is a diagrammatic view of a combined electrical and pneumatic control and timing mechanism.

In Fig. 2 I have shown a modified construction in which the delay device 40 is replaced by a pneumatic timing device 60 which comprises a cylinder 61 having an air intake 62 controlled by a ball check valve 63 and having an air outlet 64 controlled by a regulating screw 65. The plunger 66 of a solenoid $S^6$ is connected to a piston 70 slidable in the cylinder 61.

When the solenoid $S^6$ is energized, the plunger 66 and piston 70 will be raised and air will flow into the cylinder below the piston 70 through the passage 62. When the solenoid $S^6$ is deenergized and the plunger 66 is released, the plunger and piston will move downward by gravity, forcing the air in the lower end of the cylinder 61 out through the passage 64 and at a rate determined by the adjustment of the screw 65. A weight W may be provided on the plunger 66 to insure effective operation.

The solenoid $S^6$ is connected through a wire 72 to one terminal 73 of a single pole detector switch 74 and thence to a line wire L. The other lead of the solenoid $S^6$ is connected through a wire 73 to the line wire L'. The detector roll 75 and arm 76 correspond to the parts 46 and 47 previously described and operate in the same way.

Solenoids $S^7$ and $S^8$ also correspond to the motor control solenoids S and S' previously described and each have one lead connected to the line wire L'. The other leads are connected to terminals 80 and 81 in a double pole switch 82. The other terminals of said switch are connected to the line wire L.

The movable member of the switch 82 is mounted on a lever 83 pivoted at 84 and yieldingly drawn upward by a tension spring 85. Pins 86 and 87 on the plunger 66 provide lost motion engagement between the plunger 66 and the lever 83.

When the solenoid $S^6$ is not energized, the plunger 66 moves downward by gravity until the pin 86 engages the lever 83 and moves the lever 83 down. A circuit is thus closed in the switch 82 through the terminal 80 of the solenoid $S^7$ and the cutter motors are caused to rotate in normal forward direction.

If the solenoid $S^6$ is energized through closing of the detector switch 74, the plunger 66 will be drawn upward, and the switch 82 will be shifted upward by the pin 87 and the spring 85. This will energize the solenoid $S^8$ and thereby cause the cutter motors to run backward.

When the detector switch 74 again opens, the plunger 66 will return downward and will restore the switch 82 to the position shown in Fig. 2, but only after a time interval determined by the setting of the screw 65. If an additional obstruction in the cloth comes along before this interval elapses, the plunger 66 will be again drawn upward and the time interval will start over.

With both forms of my invention it will be seen that the time interval starts from the opening of the detector switch after an obstruction has passed, and furthermore that the time interval will be started over if one or more succeeding obstructions come along before the first time interval is completed. Consequently the mechanism is responsive to a wide variety of operative conditions and to any number of closely successive obstructions.

Having thus described my invention and the advantages thereof, I do not wish to be limited to the details herein disclosed, otherwise than as set forth in the claims, but what I claim is:

1. In a cloth shear, shearing elements comprising fixed and rotating cutters, a device effective to detect a seam or irregularity in the cloth being sheared, a detecting switch actuated by said device, means to effect forward rotation of said rotating cutter and rendered operative by the placing of said detector switch in one position, means to effect backward rotation of said cutter and rendered operative by the placing of said detector switch in a second position, and a timing device effective to delay renewed operation of said first means for a predetermined time interval after said detector switch is restored to first position.

2. In a cloth shear, shearing elements comprising fixed and rotating cutters, a device effective to detect a seam or irregularity in the cloth being sheared, a detecting switch actuated by said device, means to effect forward rotation of said rotating cutter and rendered operative by the placing of said detector switch in one position, means to effect backward rotation of said cutter and rendered operative by the placing of said detector switch in a second position, a timing device effective to delay renewed operation of said first means for a predetermined time interval after said detector switch is restored to first position, and means to change said time interval.

3. In a cloth shear, shearing elements comprising fixed and rotating cutters, a device effective to detect a seam or irregularity in the cloth being sheared, a detecting switch actuated by said device, means to effect forward rotation of said rotating cutter and rendered operative by the placing of said detector switch in one position, means to effect backward rotation of said cutter and rendered operative by the placing of said detector switch in a second position, and an electronic timer effective to delay renewed operation of said first means for a predetermined time interval after said detector switch is restored to first position.

4. In a cloth shear, shearing elements comprising fixed and rotating cutters, a device effective to detect a seam or irregularity in the cloth being sheared, a detecting switch actuated by said device, means to effect forward rotation of said rotating cutter and rendered operative by the placing of said detector switch in one position, means to effect backward rotation of said cutter and rendered operative by the placing of said detector switch in a second position, an electronic timer effective to delay renewed operation of said latter means for a predetermined time interval after said detector switch is restored to first position, and means to change said time interval.

5. In a cloth shear, shearing elements comprising fixed and rotating cutters, a device effective to detect a seam or irregularity in the cloth being sheared, a detecting switch actuated by said device, means to effect forward rotation of said rotating cutter and rendered operative by the placing of said detector switch in one position, means to effect backward rotation of said cutter and rendered operative by the placing of said detector switch in a second position, and a pneumatic timing device effective to delay renewed operation of said first means for a predetermined time interval after said detector switch is restored to first position.

6. In a cloth shear, shearing elements comprising fixed and rotating cutters, a device effective to detect a seam or irregularity in the cloth being sheared, a detecting switch actuated by said device, means to effect forward rotation of said rotating cutter and rendered operative by the placing of said detector switch in one position, means to effect backward rotation of said cutter and rendered operative by the placing of said detector switch in a second position, a pneumatic timing device effective to delay renewed operation of said first means for a predetermined time interval after said detector switch is restored to first position, and an air vent valve adjustable to change said time interval.

7. In a cloth shear, shearing means comprising fixed and rotating cutters, a device effective to detect a seam or irregularity in the cloth being sheared, a detecting switch actuated by said device, means to effect forward rotation of said rotating cutter and rendered operative by the placing of said detector switch in one position, means to effect backward rotation of said cutter and rendered operative by the placing of said detector switch in a second position, and means to cause said cutter to continue to rotate backward for a predetermined additional time interval only, after said switch is restored to first position.

8. In a cloth shear, shearing means comprising fixed and rotating cutters, a device effective to detect a seam or irregularity in the cloth being sheared, a detecting switch actuated by said device, means to effect forward rotation of said rotating cutter and rendered operative by the placing of said detector switch in one position, means to effect backward rotation of said cutter and rendered operative by the placing of said detector switch in a second position, and means to delay forward rotation of said cutter for a predetermined time interval which starts when said detector switch is restored to first position.

CHARLES H. COOLIDGE.